(12) United States Patent
Lunderskov et al.

(10) Patent No.: US 9,617,707 B2
(45) Date of Patent: Apr. 11, 2017

(54) SNUBBER FOR MACHINE

(71) Applicant: Caterpillar Global Mining LLC, Oak Creek, WI (US)

(72) Inventors: Kim G. Lunderskov, East Troy, WI (US); Daniel E. Bozich, Milwaukee, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 218 days.

(21) Appl. No.: 14/341,874

(22) Filed: Jul. 28, 2014

(65) Prior Publication Data

US 2016/0024746 A1 Jan. 28, 2016

(51) Int. Cl.
*E02F 3/407* (2006.01)
*E05F 5/02* (2006.01)
(Continued)

(52) U.S. Cl.
CPC ............. *E02F 3/4075* (2013.01); *E02F 3/46* (2013.01); *E02F 3/58* (2013.01); *E05F 5/022* (2013.01);
(Continued)

(58) Field of Classification Search
CPC ..... E02F 9/10; E02F 9/103; E02F 9/14; E02F 9/145; E02F 9/187; E02F 9/22;
(Continued)

(56) References Cited

U.S. PATENT DOCUMENTS

| | | | |
|---|---|---|---|
| 1,821,499 A | | 9/1931 | Culver |
| 4,207,969 A | * | 6/1980 | Howell ................... F16D 55/40 |
| | | | 188/106 P |

(Continued)

FOREIGN PATENT DOCUMENTS

| | | |
|---|---|---|
| GB | 184906 | 8/1922 |
| JP | H10102958 | 4/1998 |
| WO | 9741312 | 11/1997 |

OTHER PUBLICATIONS

Steel Founders' Society of America, "Snubber Arm for the Dipper Door Control on Mining Shovels", Catalog, Sep. 2011, 30 pages, Crystal Lake, Illinois.

(Continued)

*Primary Examiner* — Thomas B Will
*Assistant Examiner* — Jessica H Lutz (57) ABSTRACT

A snubber for a machine is provided. The snubber includes a frame that is mounted on an implement of the machine, a shaft that is operatively coupled to a movable component of the implement and a housing that is coupled to the shaft and rotatably received within the frame. The housing defines a cavity that is configured to store a fluid therein in a sealed manner. The snubber also includes at least one brake disc disposed within the housing and configured to rotate with the shaft and at least one brake pad disposed within the housing and configured to frictionally engage with the at least one brake disc to oppose rotational movement of the housing relative to the frame. The fluid is configured to at least partly remove heat generated due to the frictional engagement between the at least one brake disc and the at least one brake pad.

20 Claims, 5 Drawing Sheets

(51) Int. Cl.
    *F16D 63/00*     (2006.01)
    *F16D 55/36*     (2006.01)
    *F16D 65/853*    (2006.01)
    *E02F 3/46*      (2006.01)
    *E02F 3/58*      (2006.01)
    *E05F 3/14*      (2006.01)
    *E05F 3/20*      (2006.01)

(52) U.S. Cl.
    CPC .............. F16D 55/36 (2013.01); F16D 63/00 (2013.01); F16D 65/853 (2013.01); *E05F 3/14* (2013.01); *E05F 3/20* (2013.01)

(58) Field of Classification Search
    CPC ..... E02F 9/2207; E02F 9/2214; E02F 3/4075; E02F 3/40; E02F 3/407; E02F 3/58; E02F 3/46; F16F 7/1022; F16F 13/215; F16D 55/36; F16D 63/00; F16D 65/853; E05F 5/022; E05F 3/20; E05F 3/14
    USPC ................................... 37/442–445; 74/89.23
    See application file for complete search history.

(56) References Cited

U.S. PATENT DOCUMENTS

| | | | |
|---|---|---|---|
| 4,286,693 A | | 9/1981 | Sulzer |
| 4,517,756 A | | 5/1985 | Olds et al. |
| 4,573,728 A | * | 3/1986 | Johnson .................. B66C 3/005 188/366 |
| 4,715,641 A | * | 12/1987 | Palmer ..................... F16F 7/02 188/71.1 |
| 4,810,020 A | * | 3/1989 | Powell .................... B66C 3/005 188/381 |
| 4,890,699 A | * | 1/1990 | Megginson ............. F16D 55/40 188/18 A |
| 4,938,322 A | * | 7/1990 | Sugasawara ............ F16F 9/103 16/51 |
| 5,735,067 A | | 4/1998 | Isley et al. |
| 5,815,960 A | * | 10/1998 | Soczka ................. E02F 3/4075 16/86 B |
| 6,219,946 B1 | | 4/2001 | Soczka |
| 6,467,202 B1 | * | 10/2002 | Brown, Jr. ........... E02F 3/4075 37/398 |
| 7,096,610 B1 | | 8/2006 | Gilmore |
| 7,374,011 B2 | * | 5/2008 | Ishikawa ................ B62D 5/062 180/414 |
| 7,721,857 B2 | * | 5/2010 | Harr ......................... B66C 1/68 188/381 |
| 8,590,180 B2 | | 11/2013 | Hren et al. |
| 9,067,764 B2 | * | 6/2015 | Martinsons ............. B66C 3/005 |
| 2011/0186390 A1 | * | 8/2011 | Brenninger ............. F16D 55/40 188/71.5 |
| 2011/0239494 A1 | | 10/2011 | Dube et al. |
| 2012/0126053 A1 | | 5/2012 | christensen et al. |
| 2013/0192101 A1 | | 8/2013 | Gilmore et al. |
| 2014/0007468 A1 | | 1/2014 | Gross et al. |

OTHER PUBLICATIONS

Moog Flo-Tork, "Rotary Actuators—Imagine a World Where Your Critical Service Actuation Problems Are Solved", Article, <www.ft.moog.com> Retrieved May 21, 2014, 40 pages, ACT-125-2009, Orrville, Ohio.

* cited by examiner

SNUBBER FOR MACHINE

TECHNICAL FIELD

The present disclosure relates to a snubber for a machine, and more specifically to the snubber for an implement of the machine.

BACKGROUND

Machines such as, rope shovels typically include an implement, such as a dipper, for loading and unloading materials. The dipper may include a door that closes a rear of the dipper to hold the materials that are loaded into the dipper. Further, the door is opened to unload the contents of the dipper at a desired location. The door may be typically held closed by a latch mechanism. The latch mechanism may be released to allow the door to swing open under its own weight and the weight of the contents of the dipper. The door may be re-latched as the door rotates back in preparation for its next loading cycle.

During the swinging movement, the door may tend to hit against walls of the dipper or any other proximal component. Sudden opening and closing of the door may also cause wear to components associated with the door. Typically, dippers may be equipped with a braking device on the door linkage to reduce a swing speed as the door swings towards an open and/or closed position.

Conventional dipper door braking devices may utilize dry friction to provide a braking force. As the door swings open or close by virtue of its own weight, the braking device provides friction, thereby reducing the swing speed of the door. Heat may be generated due to friction between various components of the braking device. Further, various components of such braking devices may also be exposed to ambient conditions. Due to the heat generated during operation and exposure to ambient conditions, the braking devices may require frequent maintenance, adjustment or replacement resulting in machine downtime.

U.S. Patent Publication No. 2014/007468 (hereinafter the '468 publication) relates to a dipper assembly for a mining shovel. The dipper assembly of '468 publication includes a dipper body and a dipper door that is pivotably coupled to the dipper body, an arm, a housing coupled to one of the body and the door, and a piston. The arm includes a first end pivotably coupled to the body and a second end pivotably coupled to the door. The movement of the door relative to the body drives the arm to pivot relative to the body. The housing includes an inlet in fluid communication with a fluid source, an outlet, and a cylinder. The cylinder partially defines a pump chamber in fluid communication with the inlet and the outlet. The piston is movable within the cylinder and biased in a first direction. The pivoting movement of the arm causes the piston to move in a second direction opposite to the first direction. The movement of the piston changes a volume of the pump chamber.

SUMMARY OF THE DISCLOSURE

In one aspect of the present disclosure, a snubber for a machine is provided. The snubber includes a frame, a shaft and a housing. The frame is configured to be mounted on an implement of the machine. The shaft is operatively coupled to a movable component of the implement. The housing is coupled to the shaft and rotatably received within the frame. The housing defines a cavity that is configured to store a fluid therein in a sealed manner. The snubber also includes at least one brake disc and at least one brake pad. The at least one brake disc is disposed within the housing and configured to rotate with the shaft. The at least one brake pad is disposed within the housing and is configured to frictionally engage with the at least one brake disc to oppose rotational movement of the shaft relative to the frame. The fluid is configured to at least partly remove heat generated due to frictional engagement between the at least one brake disc and the at least one brake pad.

In another aspect of the present disclosure, a dipper system for a machine is provided. The dipper system includes a dipper body, a dipper door and a snubber. The dipper door is coupled to the dipper body and is configured to move between an open position and a closed position. Further, the snubber is disposed on the dipper body. The snubber includes a frame, a shaft and a housing. The frame is configured to be mounted on the dipper body. The shaft is operatively coupled to the dipper door. The housing is coupled to the shaft and rotatably received within the frame. The housing defines a cavity that is configured to store a fluid therein in a sealed manner. The snubber also includes at least one brake disc and at least one brake pad. The at least one brake disc is disposed within the housing and configured to rotate with the shaft. The at least one brake pad is disposed within the housing and is configured to frictionally engage with the at least one brake disc to oppose movement of the shaft relative to the frame. The fluid is configured to at least partly remove heat generated due to frictional engagement between the at least one brake disc and the at least one brake pad.

In yet another aspect of the present disclosure, a method of damping a movement of a dipper door is provided. The method includes coupling a shaft to the housing. The shaft is operatively coupled to the dipper door. The method also includes providing at least one braking disc to the housing. The at least one brake disc is configured to rotate with the shaft. The method also includes providing at least one brake pad within the housing. The method further includes engaging frictionally the at least one brake pad with the at least one brake disc to oppose movement of the housing relative to the frame. The method also includes removing at least partly heat generated due to frictional engagement between the at least one brake disc and the at least one brake pad via a fluid that is provided within the housing in a sealed manner.

Other features and aspects of this disclosure will be apparent from the following description and the accompanying drawings.

DETAILED DESCRIPTION

Figure 1:
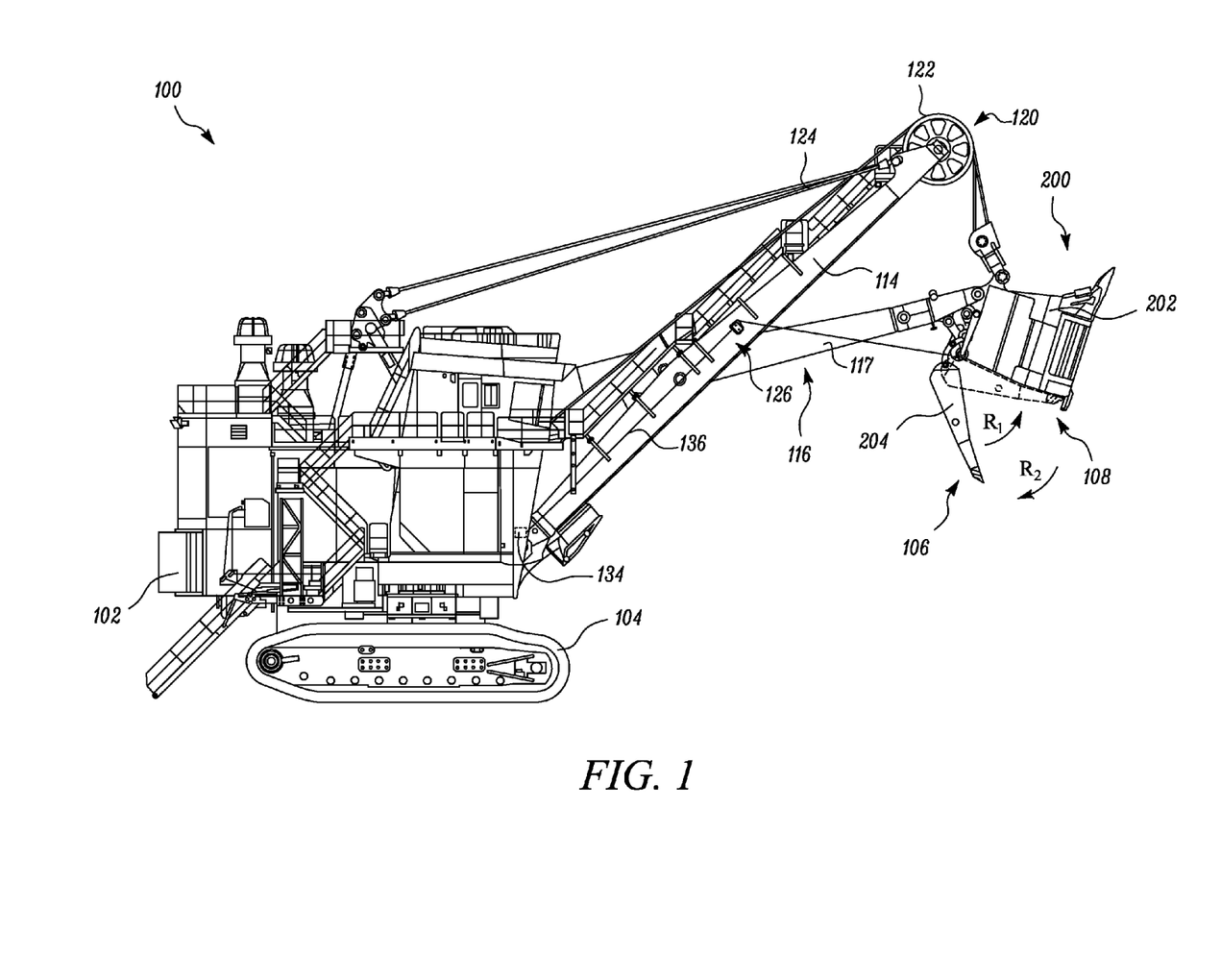
FIG. 1 is a side view of an exemplary machine showing a dipper system having a dipper door, according to an embodiment of the present disclosure.

Wherever possible, the same reference numbers will be used throughout the drawings to refer to the same or the like parts. Referring to FIG. 1, an exemplary machine 100 is illustrated, according to an embodiment of the present disclosure. The machine 100 is embodied as a rope shovel. Various embodiments of the present disclosure are described with reference to a rope shovel as the machine 100. However, the present disclosure may also be applicable to other types of machines such as, but not limited to, a hydraulic shovel and a dragline excavator.

The machine 100 includes a frame 102 that is configured to mount and/or support various components of the machine 100. The frame 102 is rotatably supported on a set of ground engaging members, for example, tracks 104 that are configured to propel the machine 100 forward or backward on ground. The tracks 104 may also be configured to turn the machine 100 by varying a speed and/or a direction of each of the tracks 104 relative to each other. Further, the machine 100 may be configured to move between a loading position and an unloading position relative to the tracks 104.

The machine 100 may also include a boom 114 extending upwardly and outwardly from the frame 102. The machine 100 may also includes a crowd mechanism 116 and a hoist mechanism 120 provided on the boom 114. The crowd mechanism 116 includes a handle 117 that is configured to slidably move with respect to the boom 114. The hoist mechanism 120 may include a winch (not shown), a pulley 122 and a hoist cable 124. The hoist cable 124 is connected to the winch at one end.

Figure 2:
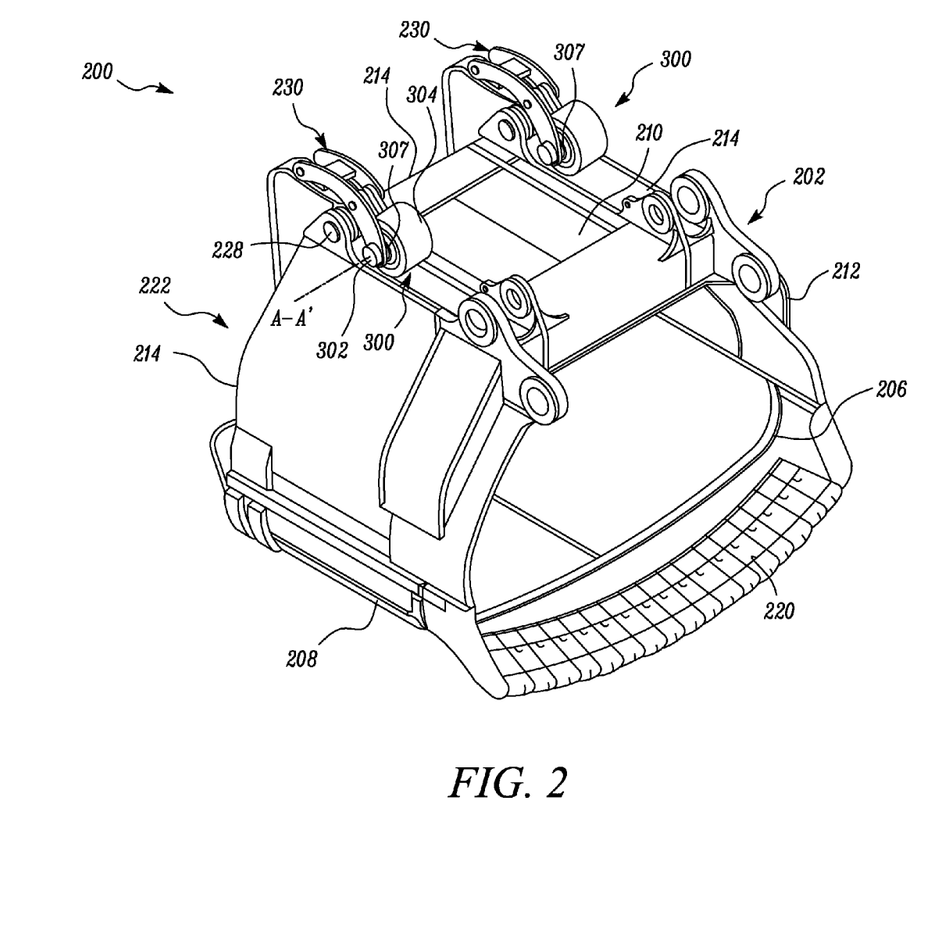
FIG. 2 is a perspective view of the dipper system having a snubber, according to an embodiment of the present disclosure.

Referring now to FIGS. 1 and 2, a dipper system 200 for the machine 100 is illustrated, according to an exemplary embodiment. The dipper system 200 may be configured to hold earth and/or other materials that may be loaded into the dipper system 200. The dipper system 200 includes a dipper body 202 and a dipper door 204 that is pivotally coupled to the dipper body 202. In the illustrated embodiment, the dipper system 200 may act as an implement of the machine 100. However, in various other embodiments, other tools having a movable component, such as a grapple may act as the implement.

Further, an other end of the hoist cable 124 extends over the pulley 122 and is connected to the dipper system 200. Based on a rotation of the winch, the cable retracts or extends relative to the winch. Accordingly, the hoist mechanism 120 is configured to raise or lower the dipper system 200 relative to the frame 102. Moreover, the dipper system 200 may extend or retract relative to the frame 102 based on the sliding movement of the handle 117.

The machine 100 may include a dipper trip mechanism 126 that is coupled to the dipper door 204. The dipper trip mechanism 126 may be configured to operate the dipper door 204. The dipper trip mechanism 126 may include a trip motor 134 and a trip cable 136 extending between the trip motor 134 and the dipper door 204. More specifically, the trip cable 136 may be coupled to a locking mechanism (not shown) of the dipper door 204. The locking mechanism may be configured to selectively lock the dipper door 204 to the dipper body 202. The locking mechanism may be any locking mechanism known in the art, such as a latch bar and lever arrangement, and so on. Based on an operation of the trip motor 134, the trip cable 136 retracts and actuates the locking mechanism. Based on an actuation of the locking mechanism, the dipper door 204 may be unlocked to dump the material at the unloading position.

The dipper body 202 includes a forward edge 206 and dipper walls 208, 210, 212 having corresponding rearward edges 214. Teeth 220 may be provided on the forward edge 206 to define a cutting edge that cuts into the ground to fill the dipper body 202.

The dipper door 204 may be pivotally connected to the dipper body 202 and abuts the rearward edges 214 of the dipper walls 208, 210, 212 to close a bottom portion 222 of the dipper body 202. The dipper door 204 is configured to move between an open position 106 (shown in FIG. 1) and a closed position 108 (shown in FIG. 1). In the illustrated embodiment, the dipper door 204 is configured to pivot about a pin joint 228 to swing between the open position 106 and the closed position 108. The dipper door 204 in the open position 106 may be rotated in a direction R1 to reach the closed position 108. Similarly, the dipper door 204 in the closed position 108 may swing away from the bottom portion 222 in a direction R2 toward the open position 106 to discharge the load in the dipper body 202.

The machine 100 includes a snubber 300 that may be configured to dampen a swinging motion of a movable component of an implement. In the illustrated embodiment, the snubber 300 may be configured to dampen a swinging motion of the dipper door 204, as the dipper door 204 swings between the open and closed positions 106 and 108. In the illustrated embodiment, two of the snubbers 300 are coupled to the dipper system 200. Moreover, the snubbers 300 are mounted on opposing ends of the rearward edges 214. Therefore, the snubbers 300 may dampen the swinging motion at respective ends of the dipper door 204. Although two snubbers 300 are shown coupled to the dipper system 200, it may be envisioned to use any number of snubbers that may be coupled to the dipper system 200 by suitable linkages.

The snubber 300 may be coupled to the dipper system 200 by a linkage assembly 230. In the illustrated embodiment of FIG. 2, the linkage assembly 230 is connected to a shaft 302 that defines a longitudinal axis A-A'. The linkage assembly 230 may be configured to transmit a movement of the dipper door 204 to the shaft 302. The shaft 302 may be configured to rotate about the axis A-A' while the dipper door 204 moves between the open position 106 and the closed positions 108.

It should be noted that the linkage assembly 230 illustrated is exemplary in nature and hence non-limiting of this disclosure. Therefore it may be envisioned to use any other appropriate linkage configurations to transmit an opening/closing movement of the dipper door 204 to a rotation of the shaft 302.

The snubber 300 includes a frame 304 that is configured to be mounted on the dipper system 200. In the illustrated embodiment, the frame 304 may have a substantially annular shape. In an embodiment, the frame 304 may have one or more flanges (not shown) that may be coupled to the dipper system 200. However, the frame 304 may be mounted on the dipper system 200 by using suitable methods known in the art such as, welding, mechanical fasteners, and the like.

Figure 3:
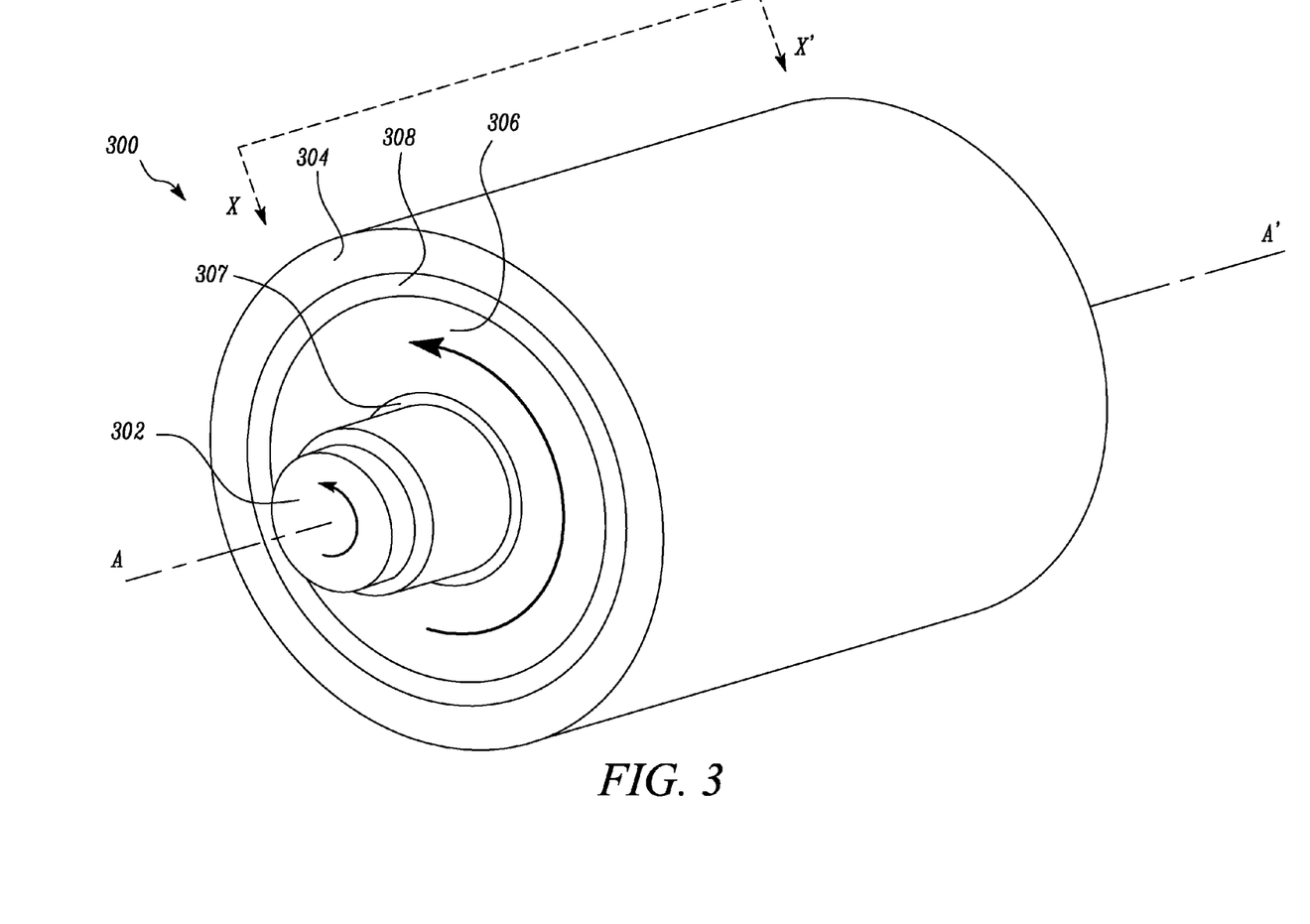
FIG. 3 is a perspective view of the snubber, according to an embodiment of the present disclosure.
Figure 4:
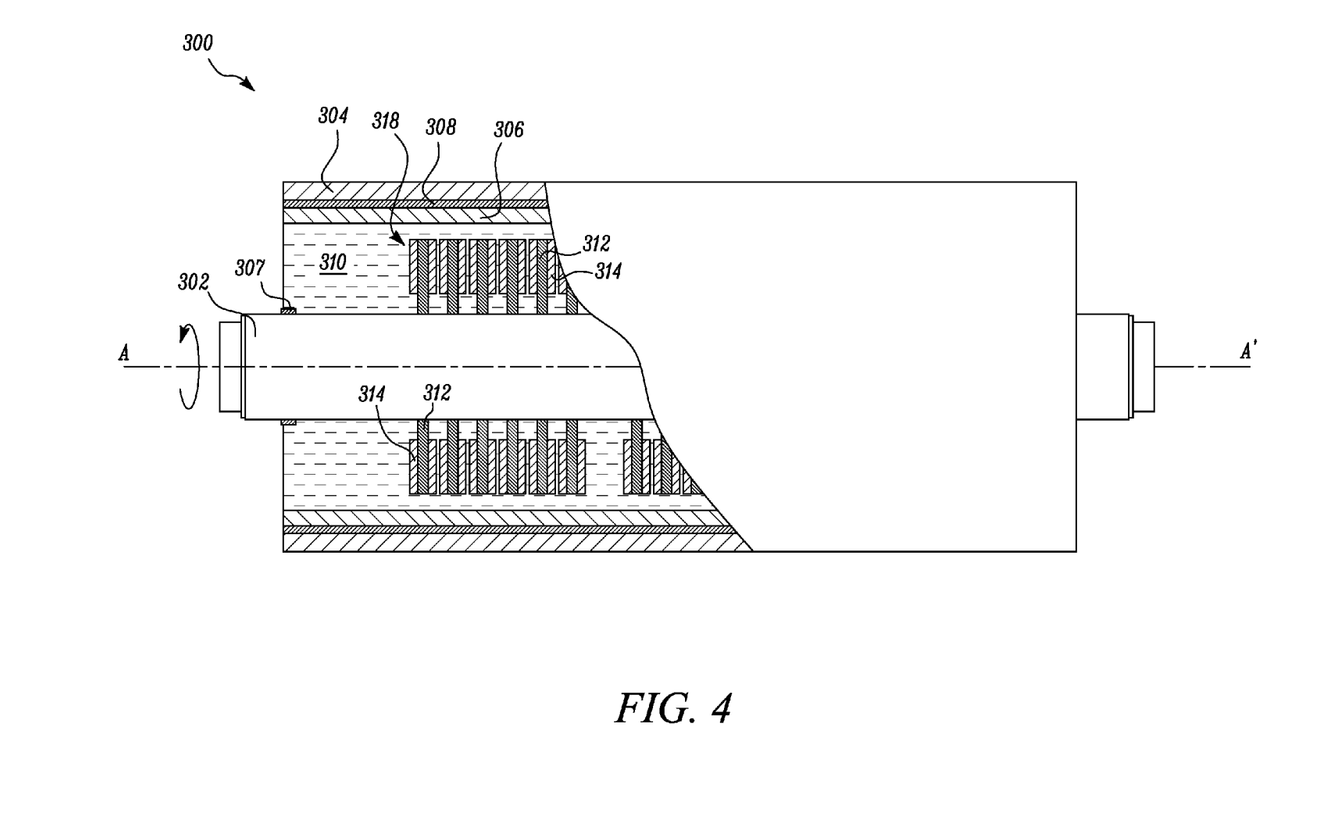
FIG. 4 is a partial cut-away view of the snubber taken along a line X-X' of FIG. 3, according to an embodiment of the present disclosure.

FIG. 3 illustrates a perspective view of the snubber 300, according to an embodiment of the present disclosure. FIG. 4 illustrates a partial cutaway view of the snubber 300, according to an embodiment of the present disclosure. Referring to FIGS. 3 and 4, the snubber 300 also includes a housing 306 that is rotatably received within the frame 304. The housing 306 may be configured to rotate relative to the frame 304. In an embodiment, a ring member 308 may be disposed between the housing 306 and the frame 304. The ring member 308 may be configured to allow rotation of the housing 306 relative to the frame 304.

The housing 306 may have a substantially hollow annular shape defining a cavity 310 therein. The cavity 310 may be configured to rotatably receive the shaft 302 therein. Further, the housing 306 may be coupled to the shaft 302. Therefore, a rotation of the shaft 302 may cause rotational motion to the housing 306. In an embodiment, the shaft 302 may be coupled to the housing 306 via splines (not shown).

Moreover, the housing 306 may be configured to store a fluid with in the cavity 310 in a sealed manner. Accordingly, the housing 306 may include one or more sealing members 307 disposed between the housing 306 and the shaft 302. The fluid may be a lubricating fluid such as, but not limited to, oil, glycol based fluids and the like. Further, when the housing 306 rotates relative to the frame 304, the fluid may circulate inside the cavity 310.

The snubber 300 includes one or more brake discs 312 that are disposed within the housing 306. The brake discs 312 may have a substantially disc like configuration. Each of the brake discs 312 may define an opening (not shown) that is configured to receive the shaft 302 therein. In an embodiment, each of the brake discs 312 may define multiple apertures (not shown). The apertures may be configured to allow a passage of the fluid therethrough.

Further, each of the brake discs 312 is coupled to the shaft 302 such that the rotation of the shaft 302 may cause rotational motion to the brake discs 312. In one embodiment, the opening of the brake disc 312 may include a plurality of splines that may be configured to engage with corresponding splines provided on the shaft 302. In another embodiment, the brake disc 312 may be welded to the shaft 302. However, a person of ordinary skill in the art will appreciate that the brake disc 312 may be coupled to the shaft 302 by any other method known in the art such that the brake discs 312 rotates with the shaft 302. Alternatively, the brake discs 312 may also be coupled to the housing 306 such that the brake discs 312 rotate with the housing 306 due to rotation of the shaft 302.

Further, one or more brake pads 314 are disposed within the housing 306. The brake pads 314 may be configured to frictionally engage with the corresponding brake discs 312 to oppose movement of the brake discs 312 relative to the frame 304. Each of the brake pads 314 may be disposed adjacent to the brake discs 312. Moreover, the brake pads 314 may be disposed within the housing 306 such that the brake pads 314 do not rotate along with the shaft 302. Thus, the brake pads 314 may generate an opposing force on the corresponding brake discs 312 when the brake discs 312 rotate with the shaft 302.

In one embodiment, two adjacent brake pads 314 may receive a portion of one of the brake discs 312 therebetween. Further, each of the brake pads 314 may include a friction material on one or more surfaces thereof. One or more spring members (not shown) may bias the brake pads 314 against the corresponding brake discs 312. Alternatively, the brake pads 314 may be biased against the brake discs 312 by calipers or any other method known in the art.

Such biasing of the brake pads 314 against the corresponding brake discs 312 may exert a frictional force on the brake discs 312. The frictional force may be proportional to the relative velocity between the brake pads 314 and the corresponding brake discs 312. The frictional force may also depend on the coefficient of friction. Such frictional force may oppose rotation of the brake discs 312.

In an embodiment, the brake discs 312 and the corresponding brake pads 314 may be grouped into one or more sets 318 (only one shown in FIG. 4). Each of the sets 318 may be configured to provide a braking force to the shaft 302 so as to oppose the rotation of the shaft 302. The brake pads 314 belonging to one of the sets 318 may be coupled to each other. In an example, one or more studs may be used to couple the brake pads 314 belonging to one set 318.

A person of ordinary skill will acknowledge that the arrangement of the brake pads 314 relative to the brake discs 312 described herein is exemplary and hence non-limiting of this disclosure. Therefore, the brake pads 314 may be disposed in other suitable configurations, such that the brake pads 314 may engage with the corresponding brake discs 312 to oppose movement of the brake discs 312 relative to the frame 304.

With such an implementation, the brake discs 312 exert torque on the shaft 302 to oppose rotation of the shaft 302. Such opposition to the rotation of the shaft 302 may be transmitted to the dipper door 204 through the linkage assembly 230 thereby opposing rotation of the dipper door 204.

Under such circumstances, heat may be generated due to the frictional engagement between the brake pads 314 and the corresponding brake discs 312. The fluid sealed inside the housing 306 is configured to at least partly remove the heat generated. In some cases, at least a portion of the fluid may evaporate upon due to absorption of the heat. Additionally, due to the rotation of the housing 306, the evaporated fluid may be transported to a relatively cooler location within the housing 306, and thereby gets condensed. Further, the fluid may also condense when the shaft 302 is not rotating, i.e., during an idle condition of the dipper door 204. The evaporation and condensation of the fluid may happen continuously during movement of the dipper door 204 thereby enabling cooling of the various components of the snubber 300. The fluid may also lubricate the various components of the snubber 300. Additionally, the fluid may oppose rotation of the shaft 302 by exerting a frictional drag on the brake discs 312. An amount of frictional drag may depend on a relative velocity between the brake discs 312.

INDUSTRIAL APPLICABILITY

Figure 5:
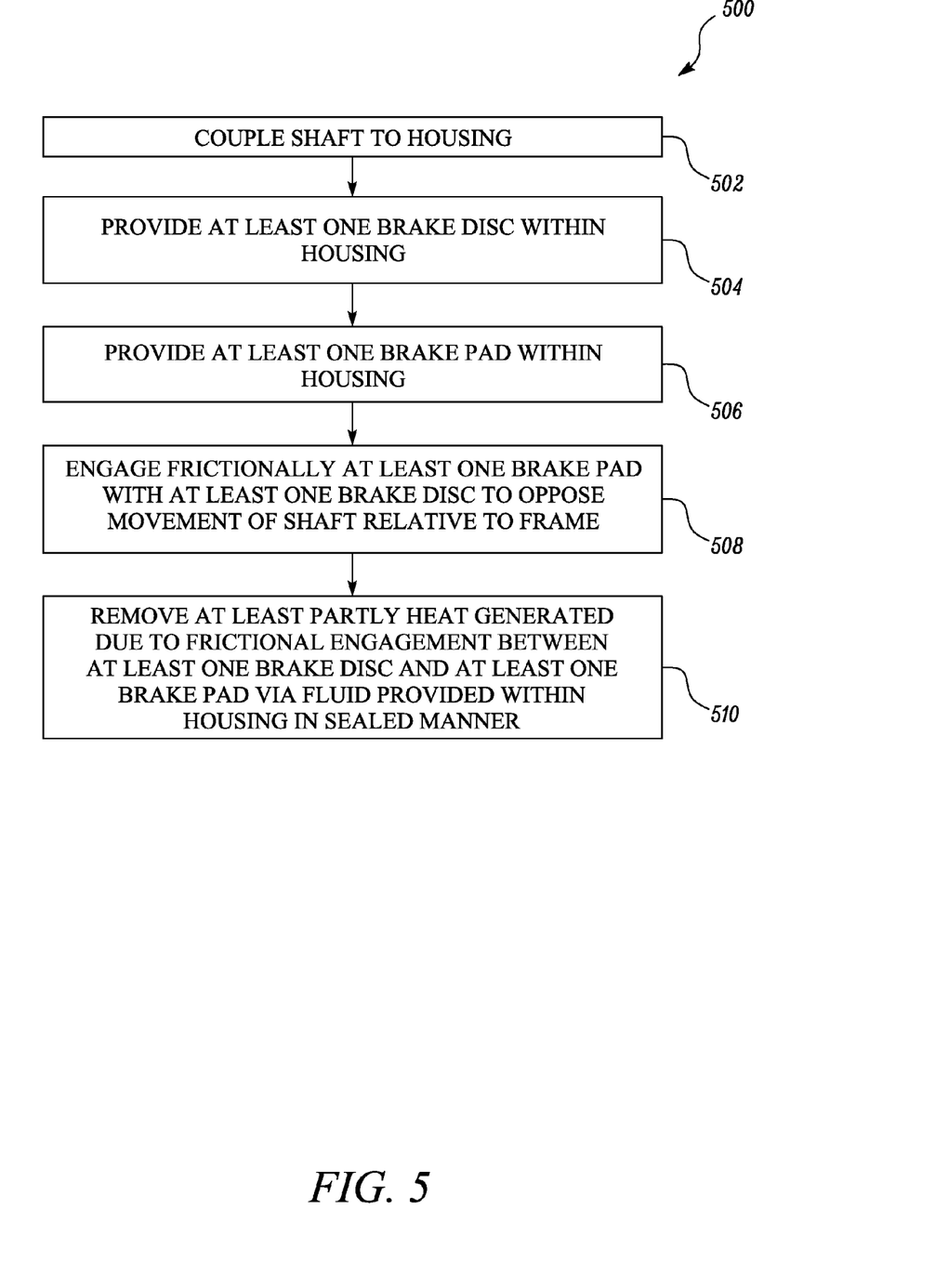
FIG. 5 is a flowchart of a method for damping a movement of the dipper door, according to an embodiment of the present disclosure.

The present disclosure relates to the dipper system 200 including the snubbers 300 and a method 500 of damping a movement of the dipper door 204. At step 502, the method 500 includes coupling the shaft 302 to the housing 306. The shaft 302 is operatively coupled to the dipper door 204. At step 504, the method 500 includes providing the at least one brake disc 312 within the housing 306. The at least one brake disc 312 is configured to rotate with the shaft 302. At step 506, the method 500 includes providing the at least one brake pad 314 within the housing 306.

At step 508, the method 500 includes engaging frictionally the at least one brake pad 314 with the at least one brake disc 312 to oppose movement of the shaft 302 relative to the frame 304. At step 510, the method 500 includes removing at least partly heat generated due to frictional engagement between the at least one brake disc 312 and the at least one brake pad 314 via the fluid that is provided within the housing 306 in a sealed manner.

The snubber 300 according to the present disclosure, may be retrofitted onto any rope shovel or other machines having an implement with a movable door. The snubber 300 may reduce the swinging speed of the dipper door 204 by opposing the rotation of the shaft 302 that is operatively coupled to the dipper door 204. A number of the brake discs 312 and the brake pads 314 may be selected to provide a desired frictional force on the brake discs 312, and the corresponding opposing torque to the shaft 302. Further, various parameters of the brake discs 312 and the brake pads 314, such as shape, dimensions and material, may also be suitably chosen.

The fluid that is stored in the housing 306 may be used to remove at least a part of the heat generated due to frictional engagement between the brake discs 312 and the brake pads 314. Thus, no external cooling mechanisms may be required for the snubber 300. Further, the fluid may also lubricate various components of the snubber 300, thereby reducing wear.

Moreover, the fluid may exert a frictional drag on the brake discs 312, thereby providing additional braking. The fluid is stored in the housing 306 in a fluid tight manner. Therefore exposure of the brake discs 312 and the brake pads 314 to ambient conditions may be prevented. The ring member 308 may also reduce wear of the housing 306 and the frame 304 due to relative movement therebetween. Therefore, the snubber 300 may require less frequent maintenance, adjustment or replacement, and thereby decreasing machine downtime and associated costs. Moreover, the snubber 300 may have an increased service life and reliability.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A snubber for a machine, the snubber comprising:
   a frame configured to be mounted on an implement of the machine;
   a shaft operatively coupled to a movable component of the implement;
   a housing rotatably received within the frame, the housing defining a cavity configured to store a fluid therein in a sealed manner and rotatably receive the shaft, the housing coupled to the shaft;
   at least one brake disc disposed within the cavity, the at least one brake disc configured to rotate with the shaft; and
   at least one brake pad disposed within the cavity, wherein the at least one brake pad configured to frictionally engage with the at least one brake disc to oppose rotational movement of the shaft relative to the frame, and wherein the fluid is configured to at least partly remove heat generated due to frictional engagement between the at least one brake disc and the at least one brake pad.

2. The snubber of claim 1, wherein the at least one brake pad and the at least one brake disc are spring biased towards each other.

3. The snubber of claim 1, wherein the frame has an annular shape.

4. The snubber of claim 1, wherein the housing has a hollow annular shape.

5. The snubber of claim 1 further comprising a ring member disposed between the frame and the housing.

6. The snubber of claim 1, wherein the shaft comprises splines on an outer surface thereof, the splines of the shaft configured to engage with splines disposed on an inner radial surface of the housing.

7. The snubber of claim 1 further comprising a set including:
   a plurality of brake discs including the at least one brake disc; and
   a plurality of brake pads including the at least one brake pad;
   wherein each of the plurality of brake discs and each of the plurality of brake pads are disposed adjacent to each other.

8. The snubber of claim 7 further comprising multiple sets of brake discs and brake pads angularly disposed about a rotation axis of the shaft.

9. The snubber of claim 1, wherein the brake disc is coupled to at least one of the shaft and the housing.

10. A dipper system for a machine, the dipper system comprising:
    a dipper body;
    a dipper door coupled to the dipper body and configured to move between an open position and a closed position; and
    a snubber disposed on the dipper body, the snubber comprising:
    a frame configured to be mounted on the dipper body;
    a shaft operatively coupled to the dipper door;
    a housing rotatably received within the frame, the housing defining a cavity configured to store a fluid therein in a sealed manner and rotatably receive the shaft, the housing coupled to the shaft;
    at least one brake disc disposed within the cavity, wherein the at least one brake disc is configured to rotate with the shaft; and
    at least one brake pad disposed within the cavity, wherein the at least one brake pad configured to frictionally engage with the at least one brake disc to oppose rotational movement of the shaft relative to the frame, and wherein the fluid is configured to at least partly remove heat generated due to frictional engagement between the at least one brake disc and the at least one brake pad.

11. The dipper system of claim 10 further comprising a linkage assembly configured to transmit a movement of the dipper door to the shaft.

12. The dipper system of claim 10, wherein the at least on brake pad and the at least one brake disc are spring biased towards each other.

13. The dipper system of claim 10, wherein the frame has an annular shape.

14. The dipper system of claim 10, wherein the housing has a hollow annular shape.

15. The dipper system of claim 10 further comprising a ring member disposed between the frame and the housing.

16. The dipper system of claim 10, wherein the shaft comprises splines on an outer surface thereof, the splines of the shaft configured to engage with splines disposed on an inner radial surface of the housing.

17. The dipper system of claim 10 further comprising a set including:
    a plurality of brake discs including the at least one brake disc; and
    a plurality of brake pads including the at least one brake pad;
    wherein each of the plurality of brake discs and each of the plurality of brake pads are disposed adjacent to each other.

18. The dipper system of claim 17 further comprising multiple sets of brake discs and brake pads angularly disposed about a rotation axis of the shaft.

19. The dipper system of claim 10, wherein the brake disc is coupled to at least one of the shaft and the housing.

20. A method of damping a movement of a dipper door, the method comprising:
- mounting a frame on the dipper door;
- rotatably receiving a housing within the frame, the housing defining a cavity;
- rotatably receiving a shaft within the cavity, wherein the shaft is coupled to the housing and is operatively coupled to the dipper door;
- providing at least one brake disc within the cavity, the at least one brake disc configured to rotate with the shaft;
- providing at least one brake pad within the cavity;
- engaging frictionally the at least one brake pad with the at least one brake disc to oppose movement of the shaft relative to the frame; and
- removing at least partly heat generated due to frictional engagement between the at least one brake disc and the at least one brake pad via a fluid, the fluid provided within the housing in a sealed manner.

\* \* \* \* \*